United States Patent [19]

Müller

[11] 3,958,471
[45] May 25, 1976

[54] METHOD OF AND APPARATUS FOR MANUFACTURING WORKPIECES HAVING POLYGONYL INNER AND OUTER CONTOURS

[75] Inventor: Johann Müller, Friedenthal, Germany

[73] Assignee: Paul-Heinz Wagner Maschinenfabrikation, Much-Birren-bachshone, Germany

[22] Filed: July 24, 1974

[21] Appl. No.: 491,315

Related U.S. Application Data

[63] Continuation-in-part of Ser. No. 330,435, Feb. 7, 1973, abandoned.

[30] Foreign Application Priority Data

Feb. 8, 1972   Germany............................ 2205768

[52] U.S. Cl....................................... 82/1 C; 82/18; 33/23 B; 33/23 H; 33/27 L; 33/30 G; 408/54
[51] Int. Cl.².......................... B23B 1/00; B23B 5/44
[58] Field of Search........................... 82/1.3, 18, 19; 33/23 B, 23 H, 27 L, 30 G, 30 D, 30 F; 408/54

[56] References Cited
UNITED STATES PATENTS

| | | | |
|---|---|---|---|
| 3,490,336 | 1/1970 | Staub................................. | 82/18 X |
| 3,593,603 | 7/1971 | Gellert................................ | 82/18 |

FOREIGN PATENTS OR APPLICATIONS

| | | | |
|---|---|---|---|
| 399,336 | 7/1924 | Germany............................. | 82/19 |

*Primary Examiner*—Leonidas Vlachos
*Attorney, Agent, or Firm*—Diller, Brown, Ramik & Wight

[57] ABSTRACT

Methodwise this disclosure relates to the manufacture of workpieces having polygonal inner or outer contours based upon radii of predetermined inner and outer circles with *n* being the number of angles of the desired polygon, the method including the steps of rotating a workpiece about its axis, moving the tool along an ellipsoidal path while in contact with the rotating workpiece with tool travel along the ellipsoidal path having velocity varying generally sinusoidally as a function of tool location, said ellipsoidal paht is radially offset from the workpiece axis of rotation and its width generally corresponds to the difference between said inner and outer radii, and rotating the workpiece about its axis for a duration of time longer than the duration of movement of the tool along the ellipsoidal path by said factor *n*.

15 Claims, 12 Drawing Figures

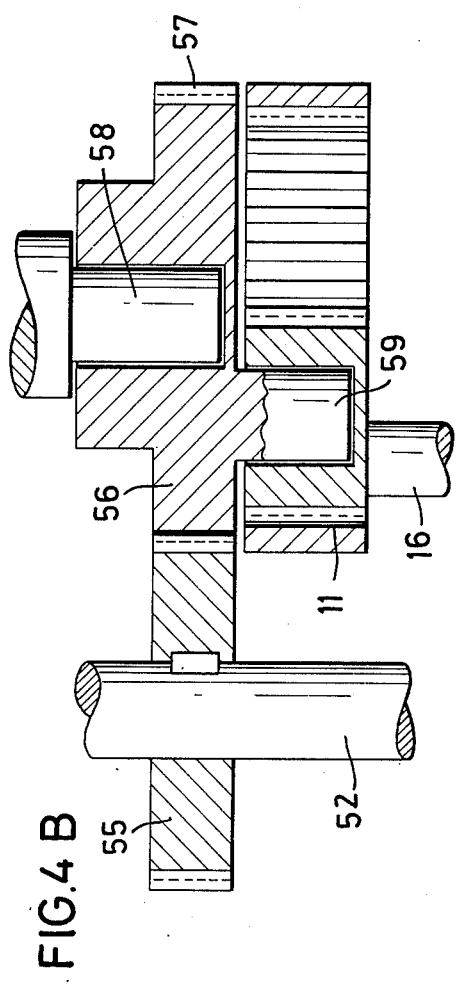
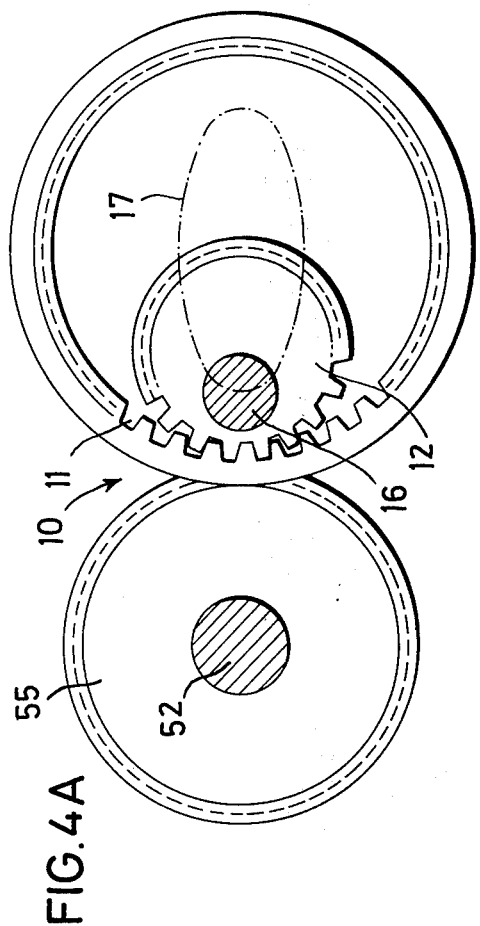
FIG.4B
FIG.4A

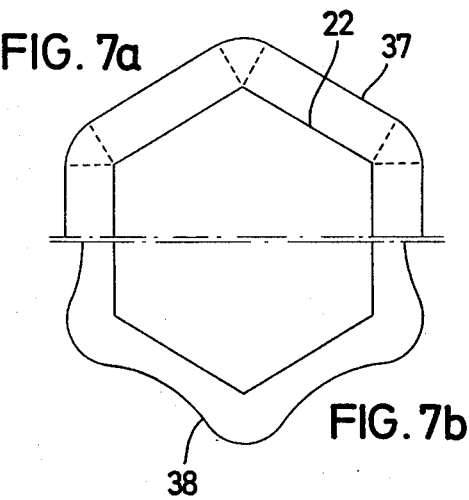
FIG. 7a
FIG. 7b
FIG. 6
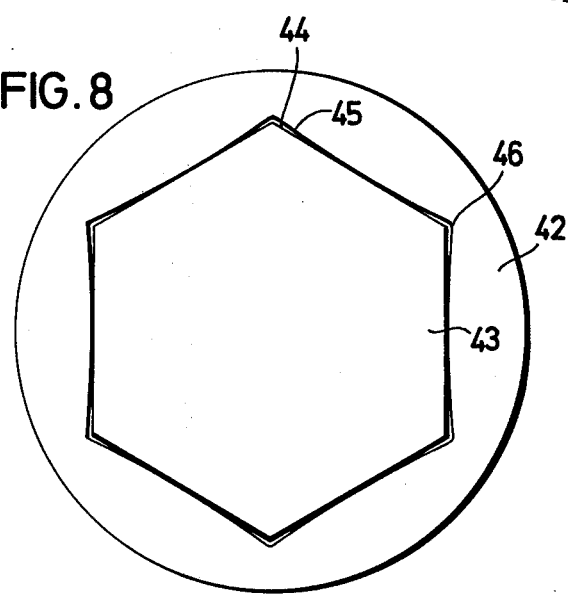
FIG. 8
FIG. 9

METHOD OF AND APPARATUS FOR MANUFACTURING WORKPIECES HAVING POLYGONYL INNER AND OUTER CONTOURS

This application is a continuation-in-part application of Ser. No. 330,435 filed Feb. 7, 1973, for METHOD OF AND APPARATUS FOR MANUFACTURING WORKPIECES HAVING POLYGONAL INNER AND OUTER CONTOURS, now abandoned.

The present invention relates primarily to a process for manufacturing or machining workpieces having polygonal inner or outer contours by means of a controlled cutting tool wherein the tool is displaced at a varying velocity which locationwise is substantially sinusoidal and with tool movement being generally along an ellipsoidal path.

In the conventional manufacture of polygonally contoured workpieces a relatively large amount of capital outlay is required since these shapes are generally cast in expensive machines or forged in expensive processes. A characteristic example is the manufacture of hexagonal or similarly polygonally shaped sockets for socket wrenches which are generally cast in small sizes and forged in larger sizes. The latter processes must be employed to manufacture on a mass production basis due to expensive tooling and obviously do not permit individual deviation. If in one or more particular instances only a few items are to be manufactured in predetermined shapes and dimensions then these processes are totally uneconomical.

It is also conventional to manufacture polygonally contoured items on lathes which are cam controlled and thus permit the formation of the contour by a material removing or cutting operation. Such special cam controls are quite specialized, complicated in design, and, of course, are entirely supplementary to standard lathe machining operations. Additionally, the angles of the polygonal contours of workpieces formed by such special cam control systems are as a rule not sufficiently abrupt or sharp-edged. Moreover, as a general rule the processes are directed specifically to the production of a predetermined polygon, for example, a hexagon, and cannot be modified for the manufacture of other shapes.

In keeping with the foregoing, it is a primary object of this invention to provide a novel method whereby polygonal structures can be produced employing standard machines, such as lathes, drilling machines or the like, and whereby it is possible through precise adjustments to vary the dimensions and shapes of the eventually formed workpieces. In accordance with the invention prior art problems are solved by providing a mechanism which defines an ellipsoidal path of travel for a cutting tool with the path being eccentric to the axis of rotation of the workpiece and having a width which corresponds substantially to the difference between the inner and outer radii of the desired polygon. In addition, the workpiece is rotated about its axis for a duration of time longer than the duration of movement of the tool along the ellipsoidal path by a factor $n$ where $n$ is the number of angles of the desired polygon.

In contradistinction to the manufacture of symmetrical workpieces which are rotated about a single axis, as in the case of a lathe, the process according to this invention imparts to the cutting tool a predetermined path which is associated and synchronized with the polygonal contour to be imparted to the rotating workpiece. Due to the synchronization of the ellipsoidal motion of the tool and the constant velocity rotation of the workpiece the over-all effect is a displacement of the tool with respect to the workpiece during the relative movement of both. In this connection, the expression "polygon" is to be understood to mean within the framework of this invention a member of polygonal configuration wherein the angles are identical and have the same spacing from each other. The connecting lines between the angles may either be straight or may "bulge" inwardly or outwardly, and it is also not entirely necessary that the angles themselves are sharp-edged although in practice this would be the general desire and achievement.

A special feature of the invention resides in the fact that the workpiece and the tool in each particular instance effect simple geometrical circular or ellipsoidal movements and the polygonal shape is produced as a result of the cooperation of these two movements. While preferably the workpiece and the tool move it is also possible for either the workpiece or the tool to be completely at a standstill with the one of the two moving having circular and ellipsoidal motion in effect superimposed upon each other, but from a machine standpoint this is most costly and would be attempted only in extremely special cases.

In one highly advantageous aspect of the invention the width of the ellipsoidal path corresponds to the difference between the radii of predetermined external and internal circles upon which is formed the polygonal shape depending upon the cutting of the tool internally or externally. In this case there is obtained the polygonal shape having sharp angles, the angle of which corresponds in each particular instance to $360/n$, where $n$ is the number of angles of the polygon.

If the length of the ellipse is twice its width then the lines between the angles are perfectly linear or straight. If, on the other hand, the width of the ellipse is smaller than half its length a polygon is formed having outwardly curved sides. If on the other hand, the width of the ellipse is greater than half its length the sides curve inwardly. Thus, it is relatively simply to influence the nature or configuration of the polygon to be produced by differences in the shape and size of the ellipse or elliptical path involved.

Due to the simultaneous motion of the tool along an ellipsoidal path and the rotation of the workpiece the actual motion of the tool becomes polygonal. Therefore, if the tool is a scriber or a sharp punctiform cutting edge the polygonal path traced will cut a polygonal contour on the rotating workpiece. Keeping this basic mode of operation in mind it is therefore clear that it is possible to produce either internal or external polygons without fundamentally changing the machine setting. When using a lathe or similar turning or cutting tools it is merely necessary that the cutting edge of the tool faces inwardly when producing an external polygon and faces outwardly when producing an internal polygon.

If the elliptical path is so arranged relative to the workpiece that it is tangent to the predetermined inner and outer circles of the to be formed polygon then sharp-edged angles are produced. If on the other hand the otherwise unchanged elliptical path is simply in effect stretched radially outwardly relative to the workpiece so that the cutting tool is displaced outwardly as compared with its position for producing an ideal or perfect polygon then the angles become slightly rounded. With this machine setting it is additionally possible to vary the over-all shape of the elliptical path such that if it is made wider the sides of the polygon which originally may have been straight by the initial setting will be curved inwardly upon next cutting a workpiece. In accordance with such changes it is even possible to manufacture gears, sprockets or the like with alterations in settings but not in over-all machine operation. If the elliptical path is narrow from the original described it is possible to machine into the workpiece a cut extending transversely over the pivot axis or to form a straight cut located externally of the pivot axis. Projecting webs or lands may also be left at the latter locations.

The apparatus for carrying into effect the method heretofore described may be a planetary gear system which would include an internally toothed ring gear with a rotating planet gear in mesh therewith which, in turn, eccentrically carries a crankpin. A chuck for the workpiece rotates at a velocity such that its rotational duration is greater by a factor $n$ than the rotational duration of the tool along the elliptical path wherein the factor $n$ is the number of angles of the polygon to be formed. While the center of the planet gear describes a circle as it moves or rotates about the ring gear the eccentrically carried crankpin will describe an elliptical path the length and width of which are a function of the degree of eccentricity. The expression "length of the elliptical path" is herein to be understood to mean the length of the main axis and the expression "width of the elliptical path" is to be understood to mean the length of the subsidiary axis. Therefore, if the tool is secured to the crankpin it will move in an elliptical path. However, in most cases it is undesirable to directly connect the tool to the crankpin and instead some type of force transmission may be employed as, for example, by hingedly connecting the crankpin to a rod through a ball joint with the rod carrying the cutting tool. By varying the point of articulation of the ball joint it is also possible to vary the size of the elliptical path without changing the ring and planet gears. The ball joint preferably is located on a line passing through the axis of rotation of the workpiece or of the chuck holding the same and it may be adjustable along said axis.

A special advantage of the method according to this invention is that the workpieces may have imparted to them in but a single operation a relatively complicated asymmetrical shape which heretofore could be produced only through a plurality of different steps of set-ups of conventional machinery. Moreover, even after the performance of a single machining operation should it be desirable to perform a further machining operation of the same workpiece this may be done without changing the centering of the workpiece on its chuck so that a high degree of true-to-dimension quality of the workpiece can be achieved.

The number of cutting tools which may be employed may vary and may be turning tools, milling tools, grinders, stationary scribers, or the like. It is also possible for the tool to be a burning device or, for that matter, a welding device when instead of forming a polygonal shape through a cutting operation it is desired to seam a particular polygonal configuration of one workpiece to that of another. While the process is particularly suitable for the economical manufacture of individual workpieces, the same is sufficiently economical to be employed for mass production purposes particularly wherein a high degree of accurate dimensioning is required and which is difficult to obtain if the workpiece is moved from machine-to-machine or station-to-station which is unnecessary in keeping with the present invention.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 4A is an enlarged cross-sectional view taken generally along cross-sectional line IV—IV, and illustrates sun and planet gearing for controlling the rotation of the workpiece about its axis during the operation thereon by the tool.

FIG. 4B is a fragmentary sectional view of the sun and planet gears of FIG. 4A.

FIG. 6 is a diagrammatic view, and illustrates the influence of a change in the ellipsoidal shape or path upon the lateral shape of a polygonal workpiece formed by a tool following the path.

Figure 1:
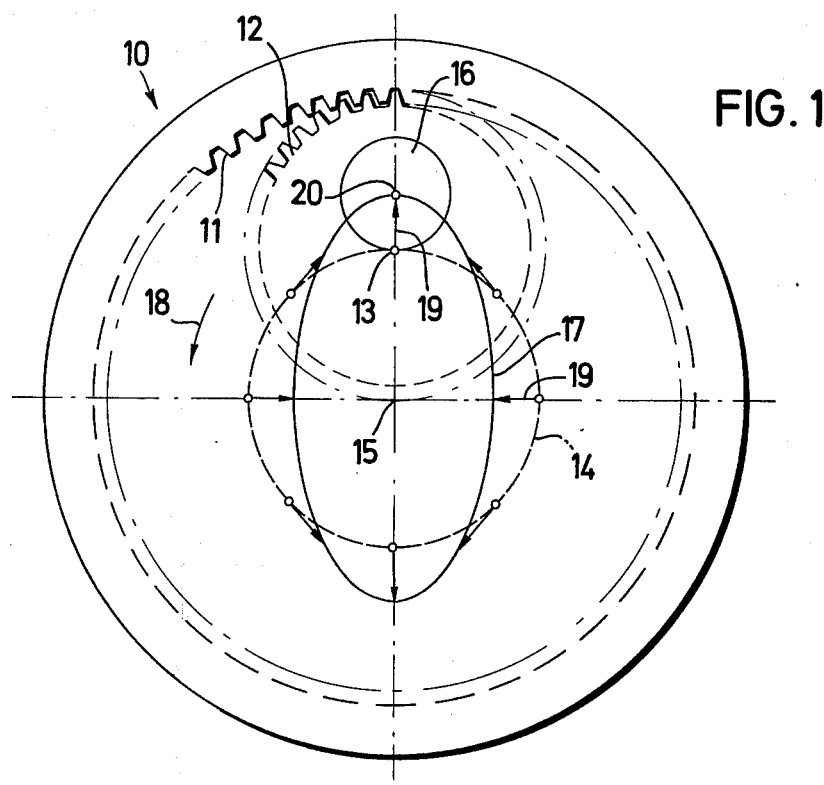
FIG. 1 is a diagrammatic view illustrating a gearing arrangement, and illustrates the manner in which a rotating planet gear carrying an eccentrically mounted crankpin transforms the normal circular motion of its axis to elliptical motion of the crankpin as the planet gear moves along the ring gear in a counterclockwise direction.

FIG. 7a partially illustrates another polygonal workpiece which has rounded corners and straight sides both internally and externally.

FIG. 7b illustrates another polygonal workpiece which has straight inner sides and curved outer sides.

FIG. 8 is a diagrammatic view illustrating the socket of a socket wrench encompassing bolt head, the socket being formed in keeping with this invention and having relieved corners.

FIG. 9 is another diagrammatic view of a workpiece, and illustrates a generally triangular body formed in accordance with this invention which can be machined in a single operation.

In keeping with the present invention it is important that the eventual tool, be it a cutting tool, a welding tool, a marking tool, or the like is displaced or moved along a substantially elliptical path whereas the workpiece effected by the tool rotates about its own central axis or the axis of a chuck or the like which is immobile or stationary. Thus, referring first to FIG. 1 a gearing arrangement 10 is provided which includes an internally toothed ring gear 11 which is generally held stationary in a conventional manner and on which rolls in meshed relationship a planet gear 12 which has half the number of gear teeth as that of the ring gear 11 and therefore also half the pitch circle diameter. A center point 13 of the planet gear 12 travels during the rotation of the planet gear 12 along a circular path 14 generally indicated in broken lines in FIG. 1. The planet gear 12 is driven at a constant velocity by a conventional drive means (not shown) which may consist, for example, of a crank rotating about a central axis 15 of the ring gear 11 and engaging at the central point 13 of the planet gear 12.

The planet gear 12 carries a crankpin 16 which is mounted eccentrically thereon, it being noted that a center point 20 of the crankpin 16 is offset a distance 19 from the center 13 of the planet gear 12. Therefore as the planet gear 12 rotates counterclockwise, as indicated by the headed arrow 18 in FIG. 1, the path described by the motion of the point 20 is an elliptical path 17. Since the eccentricity of the crankpin 16 is indicated by the arrow 19 the various positions of the arrow 19 in various angular positions of the planet gear 13 can be ascertained, and in FIG. 1 the positions of the arrows 19 are shown arcuately spaced 45° relative to each other. This clearly indicates that the center point 20 of the crankpin 16 does not travel at a constant velocity along the elliptical path 17 but instead travels at a higher velocity in the elongated zones and at a lower velocity in the more considerably curved zones. As a whole the chronological motion development of the point 20 on the elliptical path 17 is substantially sinusoidal.

Figure 2:
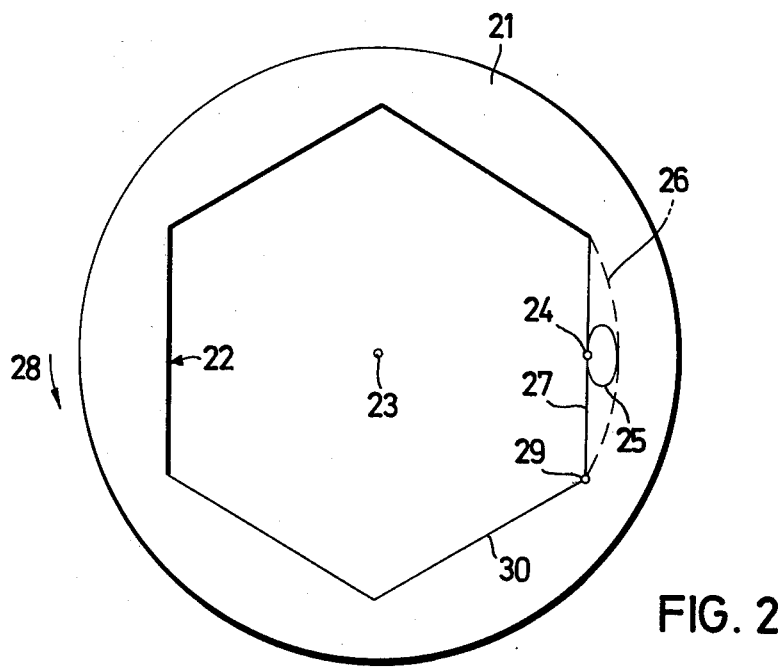
FIG. 2 is a view of the workpiece formed in accordance with the apparatus of FIG. 1, and illustrates the elliptical path which is followed by a tool during the rotation of the workpiece to form the illlustrated polygonal contour thereof.

The elliptical movement of the crankpin 16 achieved with the gearing 10 is transferred to a tool 24 (FIG. 4) in order that a workpiece 21 (for example a cylinder to be formed with an internal hexagon) may be formed. With particular reference to FIG. 2 the internal hexagon 22 which is to be formed is shown in full lines simply to better describe the invention. Assuming that the hexagon was not illustrated the workpiece 21 could simply be a solid tubular piece of material such as metal or wood which is clamped in a rotatable and oscillatable chuck 31 of a lathe (not shown). For simplicity the tool 24 is a punctiform which when moved by the crankpin 16 travels along an elliptical path 25 which when positioned initially at a particular location of the to-be-formed hexagon 22 is not shifted. In other words, assuming that the workpiece 21 is rotated about its axis 23 the tool 24 would simply continuously move along the path 25 as shown in FIG. 2 but the path would not itself bodily move. The path 25 is not the same size as the path 17 but since derived from the latter it is proportional to the same. In order to produce a hexagon, such as the hexagon 22 of FIG. 2, having straight edges, sides, faces or surfaces, the width of the elliptical path 17 and thus that of the derived elliptical path 25 is so dimensioned that it corresponds to the difference of the radii of the external circle and the internal circle of the hexagon to be formed. The radius of the outer circle is the distance between the center point 23 and the apex of each angle whereas the radius of the inner circle is the shortest distance from the point 23 to any of the straight lines 30 which would therefore be at an angle normal thereto. For clarity a portion of what is intended by the outer circle is illustrated in FIG. 2 by the reference numeral 26 and is enlarged in FIG. 3.

Figure 3:
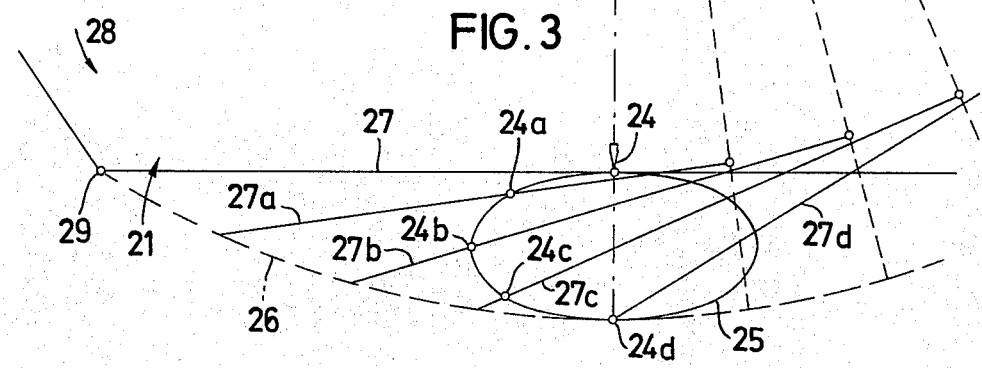
FIG. 3 is a fragmentary diagrammatic exploded view of a portion of FIG. 2, and illustrates the chronological developed motion between the tool and the workpiece during relative motion.

Turning specifically to FIG. 3, therein is illustrated a portion of the outer circle 26, one of the lines 27 of the workpiece, its center 23, the derived elliptical path 25 and the tool 24 which travels along the elliptical path 25 and relative to the workpiece 21. The tool 24 is illustrated on the subsidiary axis of the elliptical path 25 and has, in other words, passed into a position wherein it is closest to the workpiece center 23. Thus it contacts the midpoint of the illustrated face or line 27 between point 29 and a like point unillustrated to the right in FIG. 3. The rotational velocity of the workpiece 21 is so related to the rotational velocity of the tool 24 travelling along the elliptical path 25 that the workpiece is just rotating through an angle of 360/6 or 60° when the tool 24 is travelling once through the elliptical path 25. Stated otherwise, for each complete single traverse of the elliptical path 25 by the tool 24 the workpiece rotates through an angle of 60°. This means that the workpiece 21 will, by travelling one rotation along elliptical path 25 machine one side 27 and during the next full movement along the path 25 and the continued rotation of the workpiece at a constant velocity, the next adjacent side, and so on until the desired condition of the workpiece is achieved.

The workpiece 21 is shown travelling counterclockwise in the direction of the arrows 28 in FIG. 3 and the side 27 illustrated in the same Figure thereby travels in chronologically uniform points, planes or sections through positions 27a, 27b, 27c and 27d. During the same periods of time the tool 24 travelling on the elliptical path 25 moves through the points 24a, 24b, 24c, and 24d. It will be appreciated that with the presupposed synchronization of motion described the tool 24 is always located at some point or other along the chord or line 27 at all times, as illustrated by the points 24a, 24b, 24c, and 24d. Thus the tool travels along the chord or line 27 from right-to-left as viewed in FIG. 3 whereas the line or chord 27 continuously occupies the positions shown during rotation in its counterclockwise direction. This relative positioning of the various points 24, 24a, etc. relative to the various chordal positions will occur so long as the elliptical path 25 is dimensioned such that its length is twice that of its width. The point 24d is reached by the tool 24 at the same time the point 24d is reached by the corner 29 and thereafter due to the continued motion of the tool along the changing direction of the elliptical path 25 the tool automatically begins scribing, cutting, etc. the next succeeding line or chord 30. The chord 30 is machined, scribed, or otherwise affected in the manner described as the tool 24 moves from point 24d once along the path 25 and back to the same point during which time the workpiece has travelled through 60°, and this is repeated until the workpiece is completed be it welded, cut, scribed, designed or the like.

Figure 4:
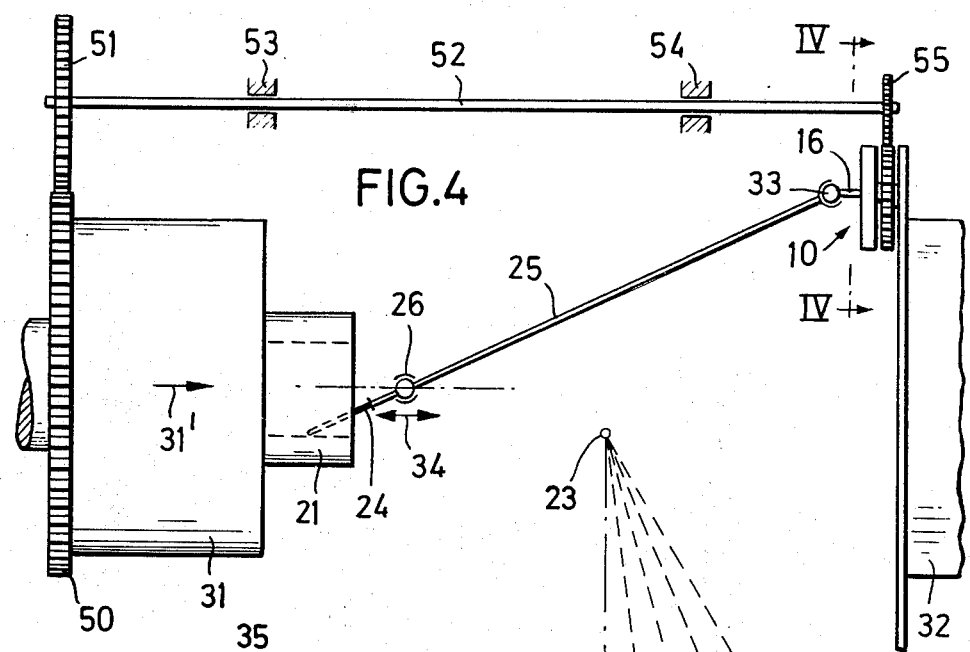
FIG. 4 is a fragmentary side elevational view of the gearing of FIG. 1 with the workpiece being held in a rotatable chuck, and illustrates the manner in which the elliptical motion of the gearing is transmitted to the tool through a rod and ball joint connections.

Reference is now more specifically made to FIG. 4 which illustrates the manner in which the tool 24 is coupled to the gear arrangement 10. As noted earlier the workpiece 21 is secured in a chuck 31 which rotates at a constant velocity and which is to be formed with an internal hexagonal bore corresponding to the bore 22 of FIG. 2. The arrow 31' indicates the direction of linear motion of the chuck 31 to feed the workpiece 21 to the tool 24 as the latter moves along the path 25 during constant velocity rotation of the workpiece 21. The tool 24 is shown secured to the end of a lever arm 39 which is simply a rod mounted in a stationary spherical bearing or universal joint 26. The bearing 26 lies on the axis 23 of the chuck 31 and the workpiece 21 carried thereby. The opposite end of the lever arm 39 is connected by another universal joint 33 to the crankpin 16 of the gear system 10 which is in turn suitably secured to the lathe slide 32. At the spindle rotating the chuck 32 there is secured a gear 50 (FIG. 4) rotating at the same speed as the chuck 31 or the workpiece 21. The gear 50 meshes with a pinion 51 fixed to a shaft 52 which in turn is supported by suitable bearings 53, 54 for rotation. The shaft 52 extends parallel to the workpiece axis and at an opposite end to the gear 51 carries a drive gear 55 fixed thereto which meshes with a gear of the sun and planet gear arrangement 10. In this manner synchronism is established between the rotational movement of the workpiece 21 and of the elliptical movement of the tool 24.

As is obvious from FIG. 4B, the drive gear 55 rotating with the shaft 52 meshes with an external gear 57 of a sun and planet gear carrier 56. The sun and planet gear carrier 56 is part of the sun and planet gear arrangement 10 of FIG. 4 and is rotationally supported by a solid bearing pin 58 within a non-illustrated gear housing. Preferably the bearing pin 58 may have interposed between itself and the sun and planet gear carrier 56 a bearing but for the sake of simplicity simply a friction bearing is shown.

The sun and planet gear carrier 56 are rotated by the drive gear 55 about the stationary bearing pin 58 which carries a pivot or trunnion on which the planet gear 12 (FIG. 4A) is mounted. The latter connection is again shown only as aa friction bearing although ball or roller bearings may be used in practice.

As was previously described relative to FIG. 1, the 50, 51. gear 12 has a crank pin 16 projecting therefrom, and upon rotation of the sun and planet gear carrier 56 the planet gear 12 rolls on the teeth of the gear 11 with the internal toothing while the crank pin 16 moves along the elliptical path 17. The cycle times of the workpiece 21, on the one hand, and of the crankpin 16 on the elliptical path, on the other hand, are like n:1. This ratio which must correspond to the number of corners of the polygon to be produced is determined by the transformation ratio of the gears 50,51. However, instead of the gears 50, 51 it may be advisable to employ a variable gear permitting the change of the transformation ratio as desired. The variable gear may have a transformation ratio which slightly deviates from the value n:1. In such a case the workpiece produced as a helical polygon contour.

When the crankpin 16 describes the elliptical path 17 (FIG. 1) during the rotation of the planet gear 12 relative to the stationary ring gear 11 in the manner heretofore described the tip (unnumbered) of the tool 24 describes the elliptical path 25 of FIGS. 2 and 3. If the tip of the tool 24 is a sharp cutting instrument it will through its movement along the path 25 and the rotation of the workpiece 21 form therein the hexagonal opening 22 during the continuous infeed of the chuck in a direction of the arrow 32'.

It is also possible by displacing the spherical bearing or universal joint 26 along the axis 23 in either direction of the double headed arrow 34 to alter the size of the elliptical path 25 and also the position thereof relative to the workpiece. For this purpose the lever arm 39 may be an adjustable element whose length may be selectively altered. Further variations in the elliptical path 25 may be effected by varying the eccentricity of the crankpin 16 on the planet gear 12. As an example, in order to produce the straight chords or faces 27 of the workpiece 21 the eccentricity of the crankpin 16 is approximately one-third the radius of the circular path 14 (FIG. 1).

Figure 5:
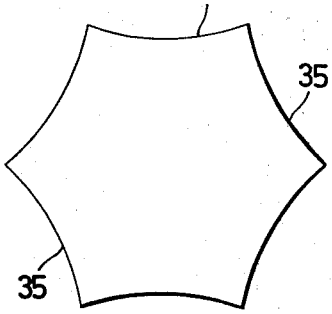
FIG. 5 is a diagrammatic view of another workpiece, and illustrates the manner in which the process may be modified to form a workpiece having an outer polygonal configuration with slightly curved sides.

If the eccentricity of the crankpin 16 is reduced so that the elliptical path 17 and the path 25 derive therefrom is made broader and shorter then the hexagon formed in the manner heretofore described acquires the configuration illustrated in FIG. 5 wherein the sides 35 are curved inwardly. If on the other hand the eccentricity of the crankpin 16 is enlarged, ie.e, if the ellipse 17 becomes narrower and longer, then the sides of the hexagon formed by the motion of the tool 24 will curve outwardly.

The influence of the eccentricity or of the elliptical shape of the path 17 on the lateral shape of a polygon undergoing formation is best shown and exemplified in FIG. 6. A straight side or chord 27 is obtained if the length-to-width ratio of the ellipse is 2-to-1. If the ratio is larger the shape is a convex curve on the projection 36 while if smaller a concave shape on the projection 35 of FIG. 6 corresponding to the surfaces 35 of FIG. 5.

FIG. 7a illustrates another workpiece which was first formed in accordance with that described heretofore to produce the workpiece 21 of FIGS. 2 and 4. In other words first was produced the perfect or ideal hexagon 22 of FIGS. 2 and 4 having straight sides and thereafter the tool 24 was shifted to the exterior periphery of the workpiece 21 resulting in the condition that the width of the now altered elliptical path does not correspond to the necessary condition of being equal to the distance between the radii of the inner and outer circles of the polygon. Thus when machining takes place straight sides 37 are formed with the corners (unnumbered) being rounded.

Referring to FIG. 7b, in this case the position of the crankpin 16 is additionally changed. The crankpin 16 is displaced inwardly so that the eccentricity is reduced and therewith is produced the hexagonal shape 38 having rounded corners and additionally inwardly curved sides 38. Thus it will be seen that with appropriate dimensioning and with the correct number of angles it is entirely possible to produce gear wheels, sprocket wheels, toothed rims, and the like without changing the position of the workpiece with respect to its center 23 and the center of the chuck 31.

FIG. 8 illustrates a hexagonal socket or spanner 42 over a hexagonal screw head, bolt head 43 or the like. The screw head 43 is conventional and is a regular hexagon having straight sides 44. The sides 45 of the hexagonal socket 42 are however curved slightly convexly inwardly so that at each corner 46 the angle is somewhat less than 120°. This "faulty fit" of the two elements 42, 43 provides the advantage that a smaller load is produced during threading or unthreading at the corners 46 which in normal arrangements receive maximum surface pressure whereas in the present embodiment the load is instead shifted to a larger area between the corners 46 of the socket 42. The socket 42 can therefore be loaded with a higher moment than sockets of known conventional comparable design having perfectly straight sides and perfectly 120° corners. Additionally the corners 46 are slightly rounded in order to reduce notching effects thereby additionally increasing the strength of the socket 42. Needless to say, the configuration of the hexagon 42 can be produced by the present invention and the curvature of the sides and the radii of the corners can be freely selected within a wide range, independently of each other.

Turning to FIG. 9, illustrated therein is a triangular body 40 which also in accordance with this invention can be machined in a single step. For this purpose the ratio of the rotational durations of the workpiece to the rotational travel path of the tool along its elliptical path is set at a ratio of 3-to-1. The outwardly curved lateral walls are obtained in the manner heretofore earlier described because the eccentricity of the crankpin 16 is enlarged. Also, in the same single step the abrupt corners 41 can be rounded in the manner indicated by the unnumbered broken lines by appropriately shifting the tool 24 toward the workpiece exterior.

While preferred forms and arrangements of parts have been shown in illustrating the invention, it is to be clearly understood that various changes in detail and arrangement of parts may be made without departing from the spirit and scope of this disclosure.

I claim:

1. A method of moving a tool to form a polygonal outline having inner or outer polygonal contours based upon radii of predetermined inner and outer circles with $n$ being the number of angles of the desired polygonal outline comprising the steps of rotating a workpiece to be outlined about a fixed axis, moving a tool along an ellipsoidal path in a plane perpendicular to the workpiece axis while in contact with the rotating workpiece with tool travel along the ellipsoidal path having a velocity varying generally sinusoidally as a function of tool location, said ellipsoidal path is radially offset from the workpiece axis of rotation, and synchronizing the relative rotation of the tool and the workpiece about its axis for a duration of movement of the tool along the ellipsoidal path by said factor $n$.

2. The method as defined in claim 1 wherein the width of the ellipsoidal path travelled by said tool corresponds generally to the difference between the radii of the inner and outer circles of the desired polygonal outline.

3. The method as defined in claim 1 wherein the length of the ellipsoidal path travelled by the tool is approximatley twice its width.

4. The method as defined in claim 1 wherein the width of the ellipsoidal path travelled by the tool is less than half its length thereby generating a polygonal outline having outwardly curved sides.

5. The method as defined in claim 1 wherein the width of the ellipsoidal path travelled by the tool is larger than half its length thereby generating a polygonal outline having inwardly curved sides.

6. The method as defined in claim 1 wherein the ellipsoidal path is located relative to the workpiece such that its longer sides are tangent to the inner and outer circles of the desired polygonal outline.

7. The method as defined in claim 1 including the additional step of subsequently displacing the ellipsoidal path travelled by the tool further outwardly away from the axis of the workpiece thereby generating a polygonal outline having rounded corners.

8. The method as defined in claim 1 wherein the workpiece is metal and the polygonal outline is a hole cut by the cutting tool upon relative movement of the tool and workpiece progressively toward each other.

9. Apparatus for moving a tool to form a polygonal outline having inner or outer polygonal contours based upon radii of predetermined inner and outer circles with $n$ being the number of angles of the desired polygonal outline comprising means for rotating a workpiece to be outlined about a fixed axis, means for moving a tool along an ellipsoidal path in a plane perpendicular to the workpiece axis while in contact with the rotating workpiece with tool travel along the ellipsoidal path in a plane perpendicular to the workpiece axis while in contact with the rotating workpiece with tool travel along the ellipsoidal path having a velocity varying generally sinusoidally as a function of tool location, said ellipsoidal path being radially offset from the workpiece axis of rotation, and means for synchronizing the relative rotation of the tool and the workpiece about its axis for a duration of time longer than the duration of movement of the tool along said ellipsoidal by the factor $n$.

10. The appratus as defined in claim 9 wherein said rotating means is a chuck gripping said workpiece with the face of the latter to be machined lying in the path of said ellipsoidal oath.

11. The appratus as defined in claim 9 wherein said control means includes a planet gear meshed with an internally toothed stationary ring gear, said planet gear carries an eccentrically mounted crankpin, and means coupling said tool to said crankpin.

12. The appratus as defined in claim 11 including a universal joint in part defining said coupling means.

13. The apparatus as defined in claim 12 wherein said universal joint is located on an extension of the axis of the chuck and workpiece.

14. The apparatus as defined in claim 12 wherein the universal joint is adjustable along an extension of the pivot axis of the chuck and workpiece for movement toward or away therefrom.

15. The apparatus as defined in claim 12 wherein the tool is a cutting tool.

* * * * *